United States Patent
Li et al.

(10) Patent No.: US 11,917,125 B2
(45) Date of Patent: Feb. 27, 2024

(54) TEST SYSTEM AND TEST METHOD FOR STABILITY OF VIDEO INTERFACE

(71) Applicant: BOE TECHNOLOGY GROUP CO., LTD., Beijing (CN)

(72) Inventors: Yanfu Li, Beijing (CN); Lihua Geng, Beijing (CN); Xitong Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 252 days.

(21) Appl. No.: 17/605,539

(22) PCT Filed: Dec. 29, 2020

(86) PCT No.: PCT/CN2020/140821
§ 371 (c)(1),
(2) Date: Oct. 21, 2021

(87) PCT Pub. No.: WO2021/174978
PCT Pub. Date: Sep. 10, 2021

(65) Prior Publication Data
US 2022/0279159 A1    Sep. 1, 2022

(30) Foreign Application Priority Data

Mar. 4, 2020 (CN) .......................... 202010143827.3

(51) Int. Cl.
*H04N 17/00* (2006.01)
*G09G 3/00* (2006.01)
*G09G 5/00* (2006.01)

(52) U.S. Cl.
CPC ............. *H04N 17/00* (2013.01); *G09G 3/006* (2013.01); *G09G 5/006* (2013.01); *G09G 2320/0247* (2013.01); *G09G 2330/12* (2013.01)

(58) Field of Classification Search
None
See application file for complete search history.

(56) References Cited

U.S. PATENT DOCUMENTS 9,491,454 B1   11/2016 Kumar et al.
11,528,473 B2 * 12/2022 Huang .................... G06T 7/001
(Continued)

FOREIGN PATENT DOCUMENTS

CN   103686030 A   3/2014
CN   105704481 A   6/2016
(Continued)

OTHER PUBLICATIONS

Notification to Grant Patent Right for Invention of Priority Application No. CN 202010143827.3 issued by the Chinese Patent Office dated Jun. 22, 2021.
(Continued)

*Primary Examiner* — Edward Martello
(74) *Attorney, Agent, or Firm* — IP & T GROUP LLP

(57) ABSTRACT

A test system for stability of video interfaces includes a display, a signal generator, a controller, and an image capturing sensor. The signal generator is configured to transmit multiple video signals to multiple video interfaces of the display. The controller is configured to control the display to sequentially display images according to each video signal. The image capturing sensor is configured to capture the images displayed sequentially by the display according to each video signal, and detect whether an image corresponding to each video signal is abnormal, and transmit a detection result to the controller.

16 Claims, 5 Drawing Sheets

(56) References Cited

U.S. PATENT DOCUMENTS

| | | | | |
|---|---|---|---|---|
| 2013/0346776 A1 | 12/2013 | Wang et al. | | |
| 2014/0226025 A1* | 8/2014 | Han | ............... | G09G 3/006 |
| | | | | 348/177 |
| 2015/0103186 A1* | 4/2015 | Zhou | ............... | H04N 17/04 |
| | | | | 348/181 |
| 2016/0205397 A1* | 7/2016 | Martin | ............... | H04N 17/04 |
| | | | | 348/192 |
| 2018/0315363 A1* | 11/2018 | Abbott | ............... | G09G 5/003 |

FOREIGN PATENT DOCUMENTS

| | | |
|---|---|---|
| CN | 206332779 U | 7/2017 |
| CN | 110010044 A | 7/2019 |
| CN | 111372076 A | 7/2020 |

OTHER PUBLICATIONS

The First Office Action of Priority Application No. CN 202010143827.3 issued by the Chinese Patent Office dated Feb. 2, 2021.

* cited by examiner

TEST SYSTEM AND TEST METHOD FOR STABILITY OF VIDEO INTERFACE

CROSS-REFERENCE TO RELATED APPLICATIONS

This application is a national phase entry under 35 USC 371 of International Patent Application No. PCT/CN2020/140821 filed on Dec. 29, 2020, which claims priority to Chinese Patent Application No. 202010143827.3, filed on Mar. 4, 2020, which are incorporated herein by reference in their entirety.

TECHNICAL FIELD

The present disclosure relates to the field of display technologies, and in particular, to a test system and a test method for stability of video interfaces.

BACKGROUND

At present, in high resolution display systems, multiple video interfaces are utilized simultaneously for a transmission of a large data amount. For video interfaces, stability test is an important link before a product leaves the factory. During the stability test, the instability of the video interfaces is manifested in the image flicker.

SUMMARY

In an aspect, a test system for stability of video interfaces is provided, which includes a display, a signal generator, a controller and an image capturing sensor. The display includes multiple video interfaces, the multiple video interfaces are connected to the signal generator and the controller, and the image capturing sensor is connected to the controller. The signal generator is configured to transmit multiple video signals to the multiple video interfaces. The controller is configured to control the display to sequentially display images according to each video signal. The image capturing sensor is configured to capture the images displayed sequentially by the display according to each video signal, and detect whether an image corresponding to each video signal is abnormal, and transmit a detection result to the controller.

In some embodiments, the controller is configured to receive a video signal from a video interface currently to be detected, and set video signals output by other video interfaces except the video interface currently to be detected to 0, and control the display to display the images according to the video signal from the video interface currently to be detected and the video signals that are set to 0 and output by the other video interfaces.

In some embodiments, the controller is further configured to control the display to display the images for a same duration according to the multiple video signals.

In some embodiments, the controller is further configured to send a synchronization signal containing information of the video interface currently to be detected to the image capturing sensor while controlling the display to display the images according to the video signal from the video interface currently to be detected and the video signals that are set to 0 and output by the other video interfaces. The image capturing sensor is further configured to receive the synchronization signal, and capture and detect the images corresponding to the video signal from the video interface currently to be detected according to the synchronization signal.

In some embodiments, the controller is further configured to control the display to display the detection result.

In some embodiments, the video interfaces are serial digital interfaces.

In some embodiments, the multiple video interfaces are four video interfaces.

In some embodiments, a signal output mode of the signal generator is a two-sample interleave (2SI) mode.

In some embodiments, the image capturing sensor is a charge coupled device image capturing sensor.

In another aspect, a test method for stability of video interfaces is provided, including: transmitting, by a signal generator, multiple video signals to multiple video interfaces of a display; controlling, by a controller, the display to sequentially display images according to each video signal; and capturing, by an image capturing sensor, the images displayed sequentially by the display according to each video signal, detecting, by the image capturing sensor, whether an image corresponding to each video signal is abnormal, and transmitting, by the image capturing sensor, a detection result to the controller.

In some embodiments, controlling the display to sequentially display the images according to each video signal, including: receiving a video signal from a video interface currently to be detected; setting video signals output by other video interfaces except the video interface currently to be detected to 0; and controlling the display to display the images according to the video signal from the video interface currently to be detected and the video signals that are set to 0 and output by the other video interfaces.

In some embodiments, the test method further includes: controlling, by the controller, the display to display the images for a same duration according to the multiple video signals.

In some embodiments, the display displays the images according to the video signal from the video interface currently to be detected for 1 min to 10 min, inclusive.

In some embodiments, the test method further includes: sending, by the controller, a synchronization signal containing information of the video interface currently to be detected to the image capturing sensor while the controller controls the display to display the images according to the video signal from the video interface currently to be detected and the video signals that are set to 0 and output by the other video interfaces; and receiving, by the image capturing sensor, the synchronization signal, and capturing and detecting, by the image capturing sensor, the images corresponding to the video signal from the video interface currently to be detected according to the synchronization signal.

In some embodiments, detecting whether the image corresponding to each video signal is abnormal, includes: determining whether an abnormality exists between every two adjacent frames of images during the images corresponding to each video signal are displayed; and in response to determine that the abnormality exists between every two adjacent frames of images, sending a detection signal to the controller.

In some embodiments, the test method further includes: receiving, by the controller, the detection signal sent by the image capturing sensor; and recording, by the controller, a number of times of abnormality during the images corresponding to each video signal are displayed.

In some embodiments, the test method further includes: controlling, by the controller, the display to display the number of times of abnormality of the images corresponding to each video signal after the controller controls the display to display the images according to each video signal sequentially.

In yet another aspect, a computer-readable storage medium having storing computer program instructions thereon is provided, and when the computer program instructions run on a processor, the processor performs one or more steps of the above testing method.

In yet another aspect, a computer program product is provided. The computer program product includes computer program instructions that, when executed by a computer, cause the computer to perform one or more steps of the above test method.

In yet another aspect, a computer program is provided. When executed by a computer, the computer program causes the computer to perform one or more steps of the above test method.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal to which the embodiments of the present disclosure relate.

DETAILED DESCRIPTION

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art on the basis of the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

In the related art, stability of a video interface of a display is detected by manually observing whether an image displayed on the display flickers. However, time for the image to flicker is random, and it may cost a very long time before the flicker appears, thereby resulting in a low detection efficiency and a low detection accuracy of a manual test method. Moreover, in a case where the display uses multiple video interfaces for the transmission of image data, the manual test method cannot detect which one of the multiple video interfaces causes the image flicker. That is, it is impossible to confirm which video interface is unstable.

Figure 1:
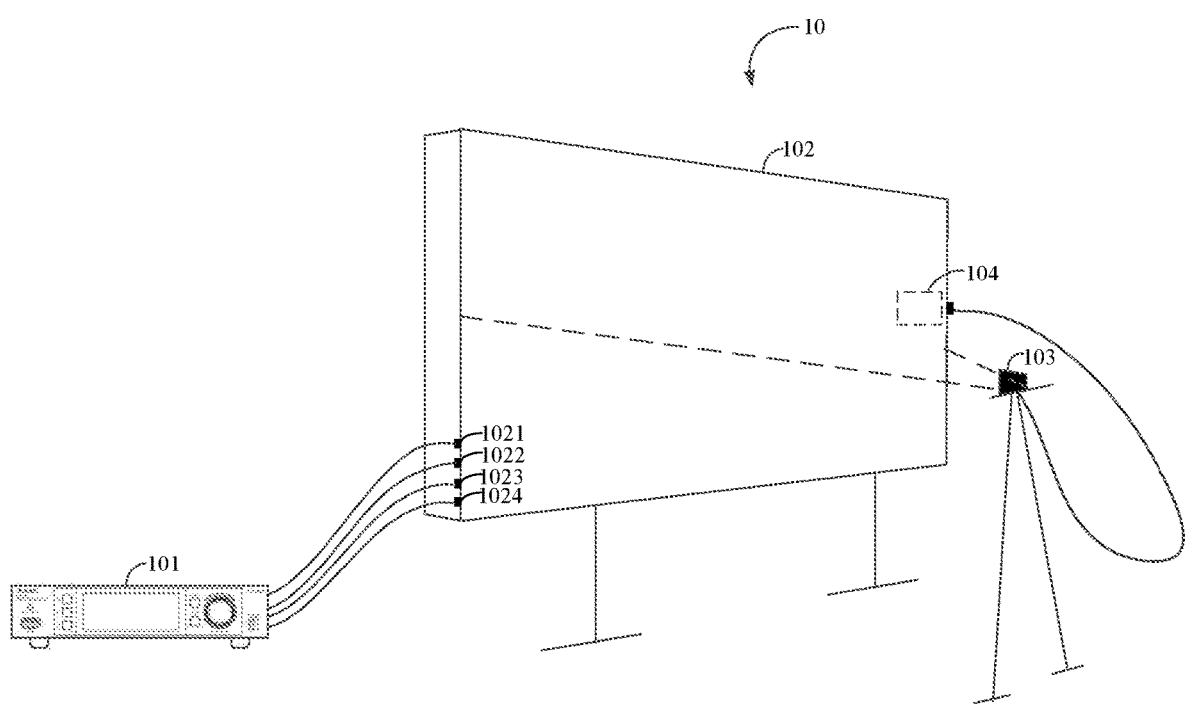
FIG. 1 is a diagram showing a structure of a test system for stability of video interfaces, in accordance with some embodiments.

FIG. 1 is a diagram showing a structure of a test system 10 for stability of video interfaces provided by embodiments of the present disclosure. As shown in FIG. 1, the test system 10 includes a signal generator 101, a display 102, an image capturing sensor 103 and a controller 104.

The display 102 includes multiple video interfaces (FIG. 1 shows four video interfaces 1021 to 1024 for illustration). The signal generator 101 and the controller 104 are connected to the multiple video interfaces, and the image capturing sensor 103 is connected to the controller 104.

The signal generator 101 is configured to transmit multiple video signals to the multiple video interfaces, and each video interface transmits one video signal.

The controller 104 is configured to control the display 102 to sequentially display images according to each video signal.

The image capturing sensor 103 is configured to capture the images displayed sequentially by the display 102 according to each video signal, and detect whether an image corresponding to each video signal is abnormal, and transmit a detection result to the controller 104.

In a possible implementation manner, the image capturing sensor 103 detects whether the image corresponding to each video signal is abnormal, which may be that, for example, it detects a color difference between two adjacent frames of captured images. For example, a color difference value between two adjacent frames of images may be calculated using an image color difference formula. When the color difference value between two adjacent frames of images exceeds a certain threshold, it is determined to be abnormal.

Or, in another possible implementation manner, the image capturing sensor 103 detects whether the image corresponding to each video signal is abnormal, which may be that, for example, it detects a luminance difference between two adjacent frames of captured images at a same position. For example, it may be possible to calculate gray scale difference values of all pixels between two adjacent frames of images at the same position first, and then calculate an average value of all the gray scale difference values. When the average value exceeds a certain threshold, it is determined to be abnormal.

The controller 104 may be, for example, a central processing unit (CPU), a digital signal processing (DSP) chip, a micro controller unit (MCU), a field programmable gate array (FPGA), an application specific integrated circuit (ASIC), a system on chip (SoC), a specific digital circuit, or a combination of the above hardwares.

In the embodiments, the controller 104 may be integrated in the display, for example, on a motherboard of the display. The controller 104 may also be arranged separately from the display 102, for example, on a motherboard of an external device (e.g., a computer), which is not limited in the embodiments of the present disclosure.

Figure 2:
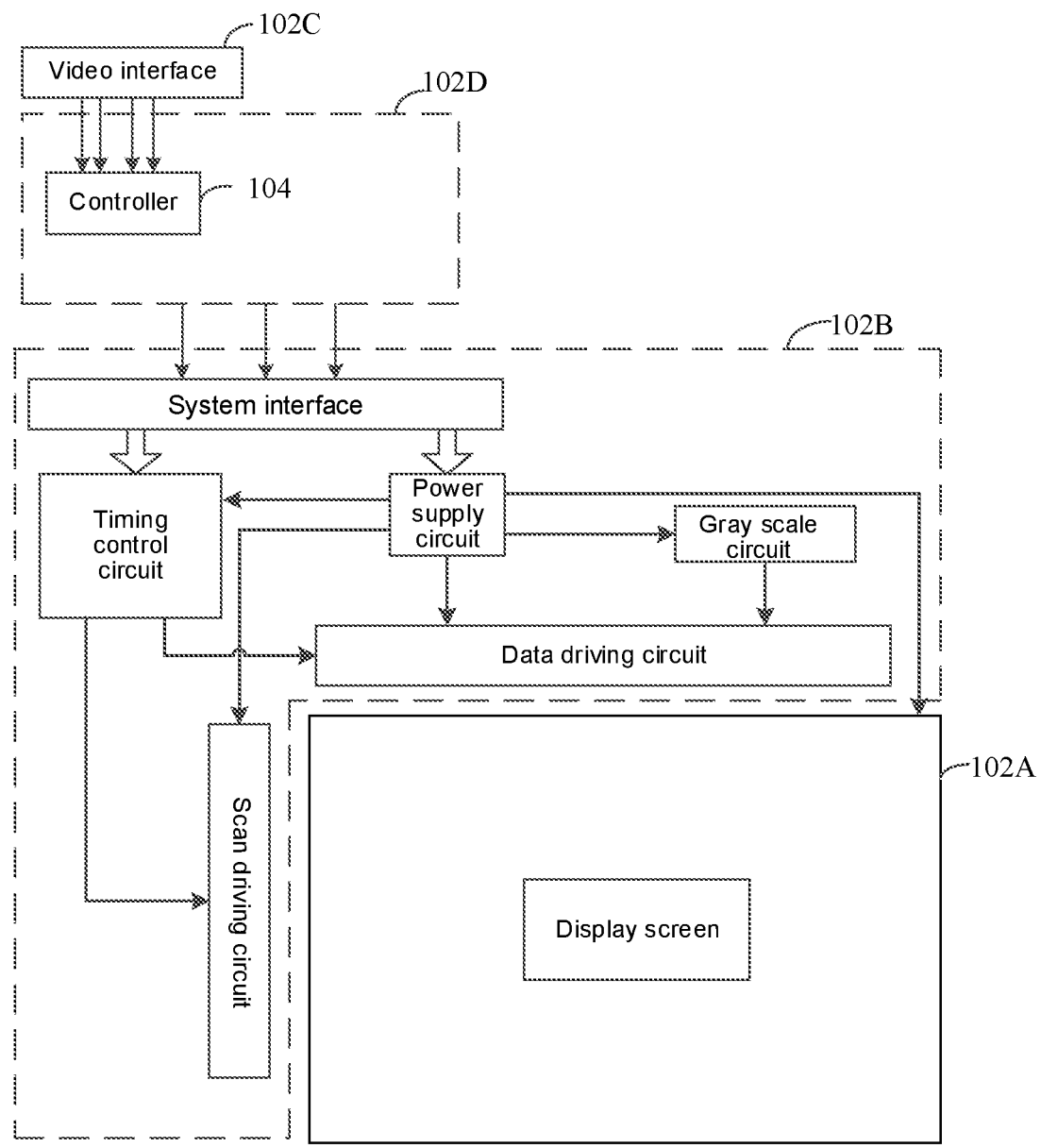
FIG. 2 is a circuit structural diagram of a display, in accordance with some embodiments.

FIG. 2 is a possible circuit structural diagram of the display 102. Referring to FIG. 2, the display 102 includes a display screen 102A, a circuit board 102B (which is also referred to as a timing controller (TCON) board) coupled to the display screen 102A, a motherboard 102D connected with the circuit board 102B, and at least one video interface 102C disposed on the motherboard 102D. As shown in FIG. 2, the controller 104 may be disposed on the motherboard 102D.

The display screen 102A may be, for example, a display screen of various types of displays, such as a liquid crystal display (LCD), an organic light-emitting diode (OLED) display, a quantum dot light-emitting diodes (QLED) display, a mini light-emitting diode (Mini-LED) display, or a micro light-emitting diode (Micro-LED) display.

In an example where the display screen 102A is an LCD display screen, the circuit board 102B may be provided with a system interface connected with the motherboard 102D and various driving circuits of the display screen 102A. The system interface may include a transistor transistor logic (TTL) interface, a low voltage differential signaling (LVDS) interface, etc. The driving circuits of the display screen 102A may include a timing control circuit, a power supply circuit, a gray scale circuit, a data driving circuit, a scan driving circuit, and the like.

With reference to a circuit structure of the display 102, a working principle of the display 102 is described as follows: video signals input from outside are input to the controller 104 through the at least one video interface 102C, and the controller 104 generates various display data and timing control signals according to the video signals. Some of these data and signals are transmitted to the power supply circuit through the system interface to generate a power supply voltage required for the operation of various driving circuits and a reference voltage for liquid crystal deflection. Some of these data and signals are transmitted to the timing control circuit through the system interfaces, and the timing control circuit generates operation timings of the data driving circuit and the scan driving circuit, and an overall timing of the display screen 102A. The data driving circuit converts a digital signal related to the display data and from the timing control circuit into an analog voltage, and the analog voltage is output to a pixel electrode to form a voltage required for the liquid crystal deflection. The gray scale circuit generates a reference voltage required by a digital-to-analog conversion portion of the data driving circuit, so that the data driving circuit converts the digital signal into the analog voltage based on the reference voltage. The scan driving circuit generates a high or low level digital voltage, and outputs it to a gate of a thin film transistor (TFT) switch to control a switching state of each row of pixels. Due to a combined action of the scan driving circuit and the data driving circuit, liquid crystal molecules may be deflected to change their arrangement, so that light passing through the liquid crystal molecules may be regularly refracted, and then is filtered by a polarizer and displayed on the display screen 102A.

Moreover, in the embodiments of the present disclosure, the image capturing sensor 103 may be disposed to cover an entire display area of the display 102, so that the image capturing sensor 103 is capable of capturing an image displayed on the entire display area of the display 102.

In some embodiments, the image capturing sensor 103 may be a charge coupled device (CCD) image capturing sensor 103.

In some embodiments, the multiple video interfaces of the display 102 may be, for example, four video interfaces, and types of the video interfaces may be, for example, all serial digital interfaces (SDIs). Of course, the above examples are only some examples provided in the present disclosure, and do not constitute a limitation on the present disclosure.

In some embodiments, in a case where the video interfaces of the display 102 each is the SDI, the signal generator 101 may be an SDI video signal generator, and its signal output mode may be a two-sample interleave (2SI) mode. Correspondingly, a display mode of the display 102 may be the 2SI mode.

It will be understood that, in a case where the signal output mode of the signal generator 101 is the 2SI mode, the signal generator 101 divides an image included in the generated video signal into four sub-images according to a 2SI image segmentation manner. The four sub-images are transmitted to the four video interfaces. In a case where the display mode of the display 102 is the 2SI mode, the controller 104 splices the four sub-images from the four video interfaces based on the 2SI image segmentation manner to obtain a complete image for display.

The so-called 2SI image segmentation manner refers to an image segmentation mode in which an original image is divided into four sub-images using a segmentation manner of uniform extracting points with at least one pixel point (e.g., two pixel points) as a unit. Referring to the diagram showing the segmentation principle of the 2SI image segmentation manner shown in FIG. 3, the points are extracted according to a marking manner shown at a left side of FIG. 3, and sample points with a same mark constitute a sub-image. That is, sample points marked as 1 constitute a sub-image a', sample points marked as 2 constitute a sub-image b', sample points marked as 3 constitute a sub-image c', and sample points marked as 4 constitute a sub-image d'.

In some embodiments, if a resolution of the display 102 is 8K, the signal generator 101 may be a 12G-SDI video signal generator, and its signal output mode may be set to a 2SI mode with 8K SDI. Correspondingly, an input mode of the display 102 may be set to a four-channel of 8K input mode, and the display mode may be set to the 2SI mode.

In some embodiments, the controller 104 is configured to receive a video signal from a video interface currently to be detected, and set video signals output by other video interfaces except the video interface currently to be detected to 0, and control the display 102 to display the images according to the video signal from the video interface currently to be detected and the video signals that are set to 0 and output by the other video interfaces.

It will be understood that, when the controller 104 receives the video signal from the video interface currently to be detected, and sets the video signals from the other video interfaces to 0, the video signal output by the video interface currently to be detected may be normally displayed on the display 102; and since the video signals output by the other video interfaces are set to 0, pixels at corresponding positions on the display screen will be displayed as black. In this way, it is equivalent to shielding the signals from the other video interfaces. The display 102 displays the images according to the video signal from the video interface currently to be detected, and the image capturing sensor 103 captures the images displayed currently by the display 102, and detects whether the image corresponding to the video signal from the video interface currently to be detected is abnormal, so as to detect whether the video interface is stable.

Figure 3:
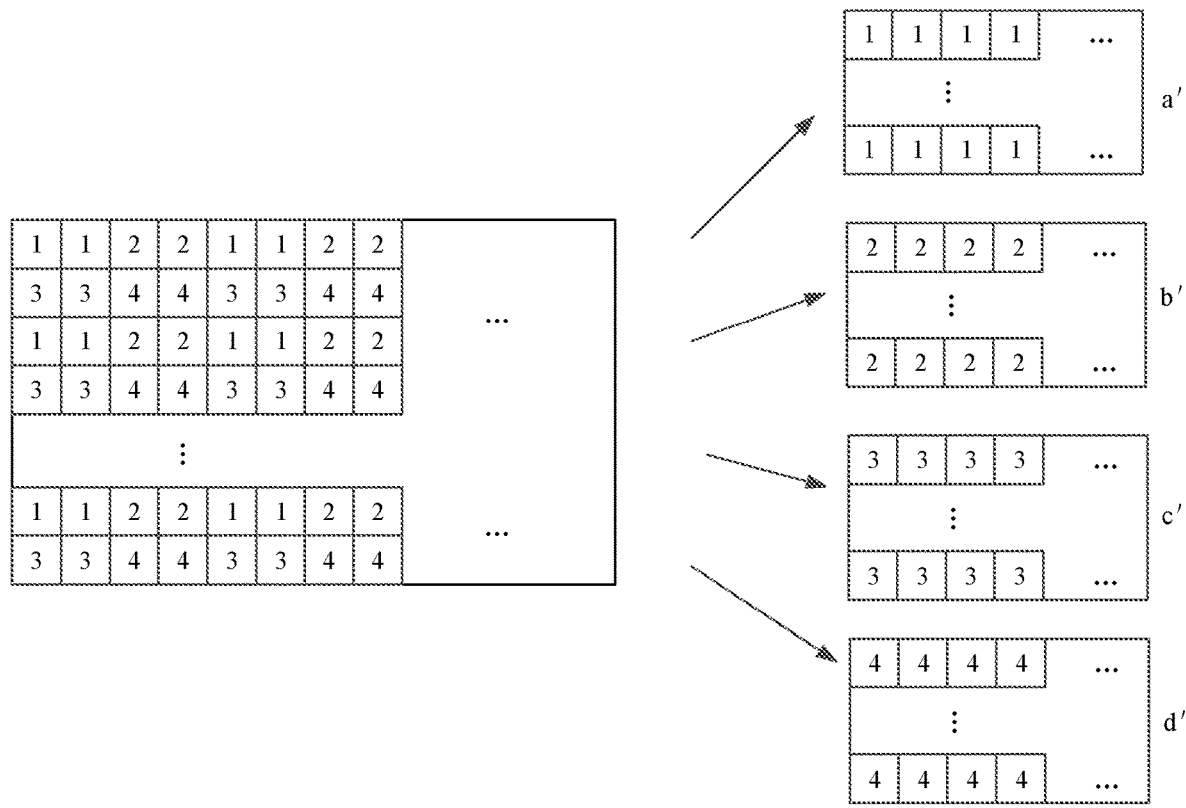
FIG. 3 is a diagram showing a segmentation principle of a 2SI image segmentation manner.
Figure 4:
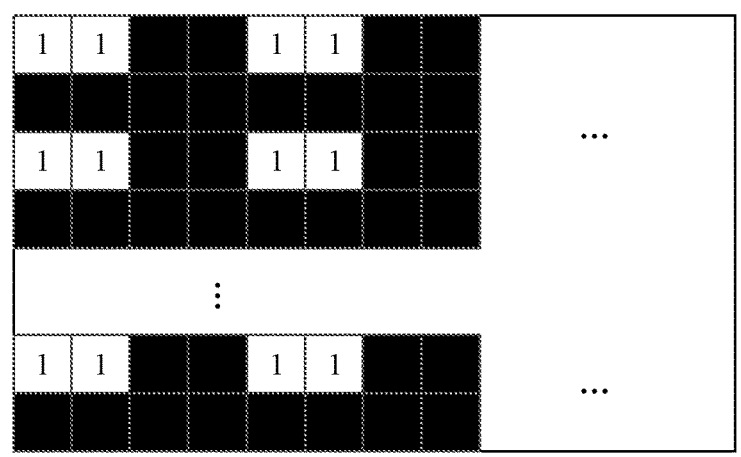
FIG. 4 is a schematic diagram of an image displayed on a display, in accordance with some embodiments.

For example, four video interfaces are considered as an example, it is assumed that the four video interfaces are the four video interfaces 1021, 1022, 1023, and 1024 shown in FIG. 1, and the video interface currently to be detected is the video interface 1021, the controller 104 receives a video signal from the video interface 1021, and sets video signals output by the video interface 1022, the video interface 1023, and the video interface 1024 to 0. Further, it is assumed that the signal output mode of the signal generator 101 and the display mode of the display 102 are the 2SI mode, and the video interface 1021, the video interface 1022, the video interface 1023, and the video interface 1024 correspondingly transmit the sub-image a', the sub-image b', the sub-image c', and the sub-image d' in the above examples respectively, as shown in FIG. 3, pixels of the sub-image a' (i.e., pixels marked as 1 in FIG. 3) may be normally displayed on the display 102, and pixels of the sub-image b', sub-image c', and sub-image d' (i.e., pixels marked as 2, 3, and 4 in FIG. 3) are displayed as black.

In some embodiments, the signal generator 101 may be configured to generate multiple video signals, and gray scale values of the pixels in each video signal are 255.

In this way, in a case where the controller 104 is configured to receive the video signal from the video interface currently to be detected, and set the video signals output by the other video interfaces except the video interface currently to be detected to 0, since the gray scale values of the pixels in the video signal output by the video interface currently to be detected are 255, and the pixels with the gray scale values of 255 are displayed as white on the display screen, the image displayed by the display 102 is a black-and-white image. An accuracy of the image capturing sensor 103 to capture the black-white image is higher than an accuracy of the image capturing sensor 103 to capture a color image. Therefore, an accuracy of the image capturing sensor 103 to detect stability of video interfaces based on the captured images may also be improved.

In some embodiments, the controller 104 is further configured to control the display 102 to display the images for a same duration according to the multiple video signals.

That is, the display 102 displays the images corresponding to the multiple video signals for the same duration. For example, the duration for the display 102 to display the images corresponding to each video signal may be t minutes, and t may be any value of 1 to 10 ([1, 10]), such as 1, 2, or 5.

In the above solution, since the display 102 displays the images corresponding to the multiple video signals for the same duration, the image capturing sensor 103 captures the same number of images corresponding the multiple video signals during the duration. That is, the image capturing sensor 103 obtains the detection results corresponding to the multiple video interfaces based on the same number of captured images, and test conditions of the multiple video interfaces are consistent. As a result, reliability of the detection result may be improved to a certain extent.

In some embodiments, the controller 104 is further configured to send a synchronization signal containing information of the video interface currently to be detected to the image capturing sensor 103 while controlling the display 102 to display the images according to the video signal from the video interface currently to be detected and the video signals that are set to 0 and output by the other video interfaces.

On this basis, the image capturing sensor 103 is further configured to receive the synchronization signal, and capture and detect the images corresponding to the video signal from the video interface currently to be detected according to the synchronization signal.

That is, when the controller 104 controls the display 102 to display the images corresponding to the video signal output by the video interface currently to be detected, the controller 104 sends the synchronization signal to the image capturing sensor 103, so that the image capturing sensor 103 may capture and detect the images synchronously according to the synchronization signal.

In some embodiments of the present disclosure, the controller 104 is further configured to control the display 102 to display the detection result.

The detection result is displayed on the display 102, so that the tester may quickly determine states of the multiple video interfaces and record the video interface with problems.

Figure 5:
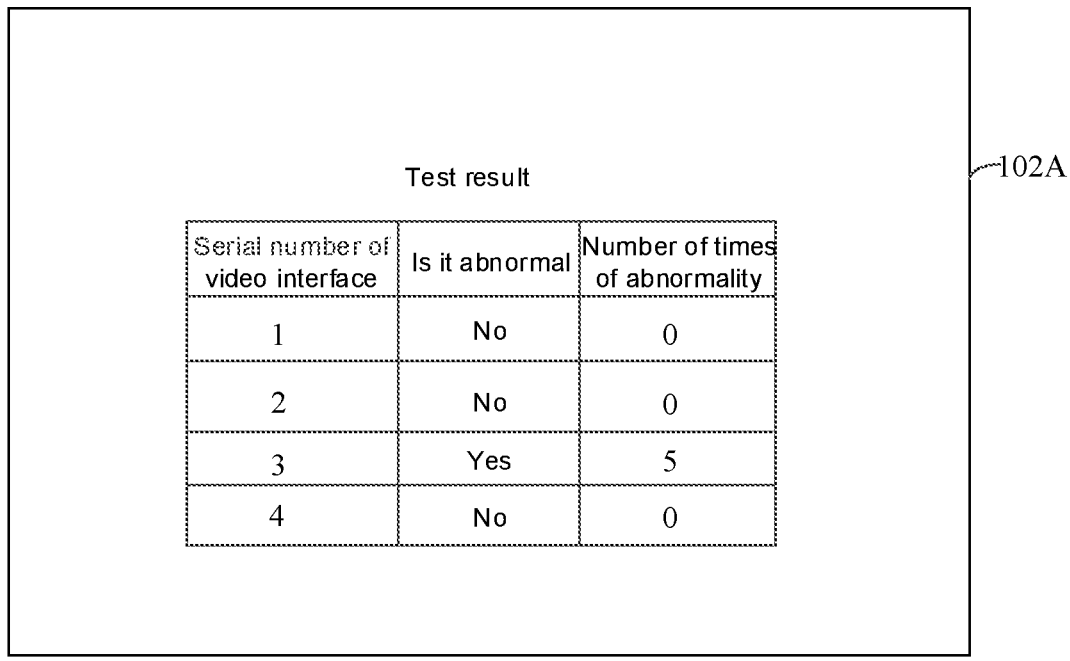
FIG. 5 is a diagram showing a detection result, in accordance with some embodiments.

FIG. 5 is a diagram showing a possible detection result. Referring to FIG. 5, the detection result may include serial numbers of the multiple video interfaces and whether there is an abnormality in the images corresponding to the video signals output by the multiple video interfaces and the number of times of abnormality, and the like. In some possible embodiments, the detection result may further include other related information, such as the number of times of detection of each video interface, and detection time used for a single detection, which are not specifically limited in the embodiments of the present disclosure.

In some embodiments, an option for testing stability of video interfaces may be integrated in an on-screen display (OSD) menu of the display 102 in advance.

In this way, the tester may call a stability test mode through a menu key disposed on a remote controller or the display screen 102A, and the stability test of the video interfaces starts after the stability test mode is selected.

Figure 6:
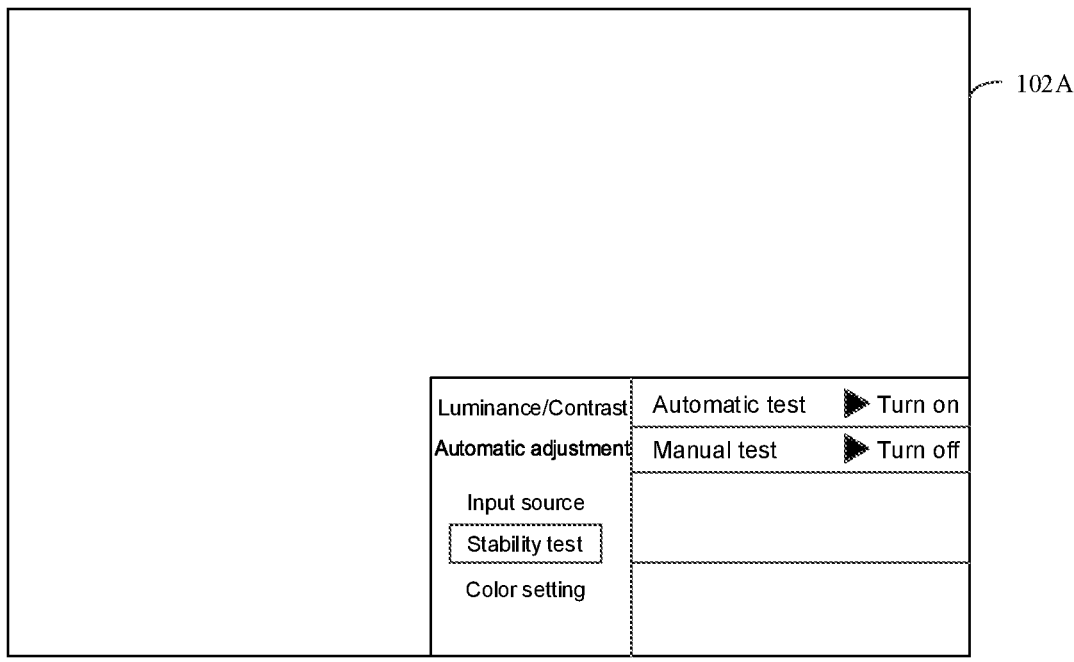
FIG. 6 is a schematic diagram of an on screen display (OSD) menu of a display, in accordance with some embodiments.

For example, FIG. 6 shows an OSD menu that integrates the option for testing the stability of video interfaces. Referring to FIG. 6, the OSD menu may be displayed on the display screen 102A. The OSD menu may include the option for testing stability (stability test) and common options for adjusting the display. The common options for adjusting the display may include, for example, a luminance/contrast option, an automatic adjustment option, an input source option, a color setting option. After the tester selects the option for testing the stability through the remote controller or a button disposed on the display screen 102A, options for setting the stability test for the video interfaces may be further displayed at a right side of the option for testing the stability; for example, the options may include an automatic test option, a manual test option, and a select interface option. After the automatic test option is turned on, the display may test the video interfaces according to default parameters. After the manual test option is turned on, the display may test the video interfaces according to parameters input by the tester.

In the embodiments of the present disclosure, the signal generator 101 may transmit video signals to the multiple video interfaces of the display 102, and the controller 104 may control the display 102 to sequentially display the images according to the video signal from each video interface. The image capturing sensor 103 may capture the images displayed sequentially by the display 102 according to each video signal, and detect whether the image corresponding to each video signal displayed by the display 102 is abnormal. If the image capturing sensor 103 detects that an image corresponding to a certain video signal displayed by the display 102 is abnormal, it means that the video interface that transmits the video signal is unstable. Conversely, if the image capturing sensor 103 does not detect that the image corresponding to a certain video signal displayed by the display 102 is abnormal, it means that the video interface that transmits the video signal is stable. That is, a system for detecting the stability of video interfaces provided by the embodiments is capable of automatically detecting stability of each of the multiple video interfaces, and has a high detection efficiency.

It will be noted that, after obtaining the test result, that is, after determining whether the multiple video interfaces are stable, the video interfaces may be maintained or debugged in a targeted manner according to the detection result. For example, if the detection result indicates that the image corresponding to the video interface 1023 is unstable, that is, the video interface 1023 is unstable, only the video interface 1023 may be maintained to improve its performance.

Figure 7:
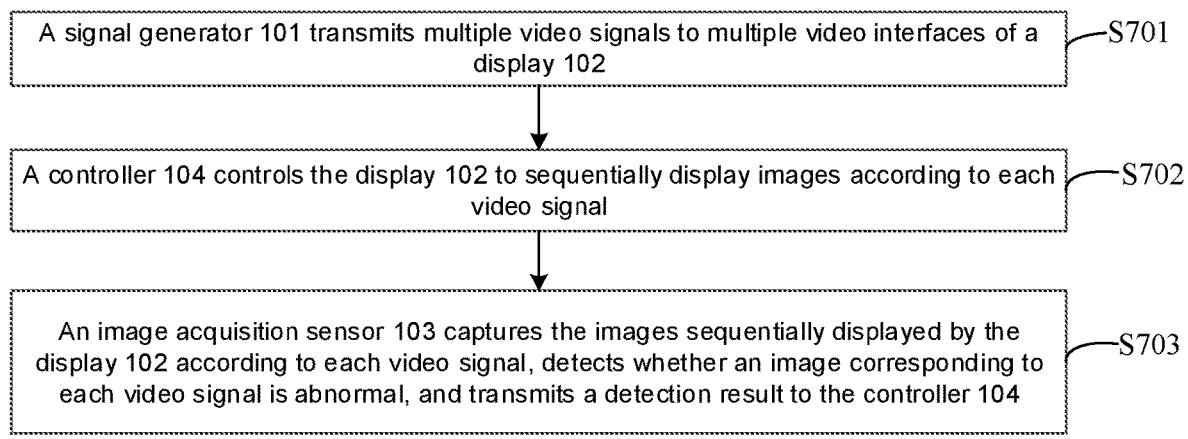
FIG. 7 is a flow diagram of a test method for stability of video interfaces, in accordance with some embodiments.

Based on the test system of any of the above embodiments, in the embodiments of the present disclosure, a test method for stability of video interfaces is further provided. FIG. 7 is a flow diagram of the test method. As shown in FIGS. 1 and 7, the test method includes the following steps.

In S701, a signal generator 101 transmits multiple video signals to multiple video interfaces of a display 102.

In S702, a controller 104 controls the display 102 to sequentially display images according to each video signal.

In the above steps, for example, the display 102 displays the images according to multiple video signals for a same duration. The display 102 displays the images according to a video signal from a video interface currently to be detected for 1 min to 10 min, inclusive, for example.

In S703, an image capturing sensor 103 captures the images displayed sequentially by the display 102 according to each video signal, detects whether an image corresponding to each video signal is abnormal, and transmits a detection result to the controller 104.

In the above test method, if the image capturing sensor 103 detects that an image corresponding to a certain video signal displayed by the display 102 is abnormal, it means that the video interface that transmits the video signal is unstable. Conversely, if the image capturing sensor 103 does not detect that the image corresponding to a certain video signal displayed by the display 102 is abnormal, it means that the video interface that transmits the video signal is stable. That is, the test method for stability of video interfaces provided by the embodiments of the present disclosure is capable of automatically detecting stability of each of the multiple video interfaces, and has a high detection efficiency.

In some embodiments, the test method may further include: while the controller 104 controls the display 102 to display the images according to the video signal from the video interface currently to be detected and the video signals that are set to 0 and output by the other video interfaces, the controller 104 sending a synchronization signal containing information of the video interface currently to be detected to the image capturing sensor 103; the image capturing sensor 103 receiving the synchronization signal, and capture and detect the images corresponding to the video signal from the video interface currently to be detected according to the synchronization signal. As a result, while the display 102 displays the images corresponding to the video signal output by the video interface currently to be detected, the image capturing sensor 103 may perform the acquisition and detection operations, and determine which video interface is currently detected.

In some embodiments, the controller 104 controls the display to sequentially display the images according to each video signal (i.e., S702), which includes the following steps: the controller 104 controlling the display 102 to receive the video signal from the video interface currently to be detected; the controller 104 controlling the display to set the video signals output by other video interfaces except the video interface currently to be detected to 0; and the controller 104 controlling the display 102 to display the images according to the video signal from the video interface currently to be detected and the video signals that are set to 0 and output by the other video interfaces.

In some embodiments, in S703, the image capturing sensor 103 detects whether the image corresponding to each video signal is abnormal, which may include: the image capturing sensor 103 determining whether an abnormality exists between every two adjacent frames of images during the images corresponding to each video signal are displayed; if so, the image capturing sensor 103 sending a detection signal to the controller 104.

A method for determining whether there is an abnormality between two adjacent frames of images may be referred to the related description of the test system in the above embodiments, which will not be repeated here.

In some embodiments, the test method may further include: the controller 104 receiving the detection signal sent by the image capturing sensor 103; and the controller 104 recording the number of times of abnormality during the images corresponding to each video signal are displayed.

It will be understood that, the image capturing sensor sends a detection signal to the controller 104 after determining that there is an abnormality between two adjacent frames of images. As a result, every time the controller 104 receives the detection signal, it means that one abnormality has occurred. In other words, the number of detection signals received by the controller 104 is the number of times of abnormality.

In some embodiments, the test method further includes: after the controller 104 controls the display to display the images according to each video signal sequentially, the controller 104 controlling the display to display the number of times of abnormality of the images corresponding to each video signal. This makes it easy for the tester to know whether the multiple video interfaces are stable or not, and the degree of instability of the multiple video interfaces. For example, if the number of times of abnormality of the video interface 1021 is zero, the number of times of abnormality of the video interface 1022 is one, the number of times of abnormality of the video interface 1023 is zero, and the number of times of abnormality of the video interface 1024 is three, it can be seen that the video interface 1021 and the video interface 1023 are stable, the video interface 1022 and the video interface 1024 are unstable, and the video interface 1024 is more unstable.

Related concepts and terms involved in the test method may be referred to the related description in the embodiment shown in FIG. 1, which will not be repeated here.

In some embodiments of the present disclosure, a computer-readable storage medium (e.g., a non-transitory computer-readable storage medium) is provided. The computer-readable storage medium has stored computer program instructions thereon, and when the computer program instructions run on a processor, the processor performs one or more steps in the test method for stability of video interfaces as described in any one of the above embodiments.

For example, the computer-readable storage medium may include, but is not limited to a magnetic storage device (e.g., a hard disk, a floppy disk or a magnetic tape), an optical disk (e.g., a compact disk (CD), a digital versatile disk (DVD)), a smart card and a flash memory device (e.g., an erasable programmable read-only memory (EPROM), a card, a stick or a key driver). Various computer-readable storage media described in the present disclosure may represent one or more devices and/or other machine-readable storage media for storing information. The term "machine-readable storage media" may include, but is not limited to, wireless channels and other various media capable of storing, containing and/or carrying instructions and/or data.

Some embodiments of the present disclosure also provide a computer program product. The computer program product includes computer program instructions that, when executed by a computer, cause the computer to perform one or more steps in the test method for stability of video interfaces as described in the above embodiments.

In some embodiments of the present disclosure, a computer program is also provided. When executed by a computer, the computer program causes the computer to perform one or more steps in the test method for stability of video interfaces as described in the above embodiments.

Beneficial effects of the computer-readable storage medium, the computer program product, and the computer program are the same as beneficial effects of the test method for stability of video interfaces as described in some embodiments, which will not be repeated here.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A test system for stability of video interfaces, comprising:
    a display, wherein the display includes multiple video interfaces;
    a signal generator connected to the multiple video interfaces, wherein the signal generator is configured to transmit multiple video signals to the multiple video interfaces;
    a controller connected to the multiple video interfaces, wherein the controller is configured to control the display to sequentially display images according to each video signal; and
    an image capturing sensor connected to the controller, wherein the image capturing sensor is configured to capture the images displayed sequentially by the display according to each video signal, and detect whether an image corresponding to each video signal is abnormal, and transmit a detection result to the controller;
    wherein the controller is configured to receive a video signal from a video interface currently to be detected, and set video signals output by other video interfaces except the video interface currently to be detected to 0, and control the display to display the images according to the video signal from the video interface currently to be detected and the video signals that are set to 0 and output by the other video interfaces.

2. The test system according to claim 1, wherein the controller is further configured to control the display to display the images for a same duration according to the multiple video signals.

3. The test system according to claim 1, wherein the controller is further configured to send a synchronization signal containing information of the video interface currently to be detected to the image capturing sensor while controlling the display to display the images according to the video signal from the video interface currently to be detected and the video signals that are set to 0 and output by the other video interfaces; and
    the image capturing sensor is further configured to receive the synchronization signal, and capture and detect the images corresponding to the video signal from the video interface currently to be detected according to the synchronization signal.

4. The test system according to claim 1, wherein the controller is further configured to control the display to display the detection result.

5. The test system according to claim 1, wherein the video interfaces are serial digital interfaces.

6. The test system according to claim 5, wherein the multiple video interfaces are four video interfaces.

7. The test system according to claim 5, wherein a signal output mode of the signal generator is a two-sample interleave mode.

8. The test system according to claim 1, wherein the image capturing sensor is a charge coupled device image capturing sensor.

9. A test method for stability of video interfaces, comprising:
    transmitting, by a signal generator, multiple video signals to multiple video interfaces of a display;
    controlling, by a controller, the display to sequentially display images according to each video signal; and
    capturing, by an image capturing sensor, the images displayed sequentially by the display according to each video signal, detecting, by the image capturing sensor, whether an image corresponding to each video signal is abnormal, and transmitting, by the image capturing sensor, a detection result to the controller;
    wherein controlling the display to sequentially display the images according to each video signal, including:
    receiving a video signal from a video interface currently to be detected;
    setting video signals output by other video interfaces except the video interface currently to be detected to 0; and
    controlling the display to display the images according to the video signal from the video interface currently to be detected and the video signals that are set to 0 and output by the other video interfaces.

10. The test method according to claim 9, further comprising:
    controlling, by the controller, the display to display the images for a same duration according to the multiple video signals.

11. The test method according to claim 9, wherein the display displays the images according to the video signal from the video interface currently to be detected for 1 min to 10 min, inclusive.

12. The test method according to claim 9, further comprising:

sending, by the controller, a synchronization signal containing information of the video interface currently to be detected to the image capturing sensor while the controller controls the display to display the images according to the video signal from the video interface currently to be detected and the video signals that are set to 0 and output by the other video interfaces; and receiving, by the image capturing sensor, the synchronization signal, and capturing and detecting, by the image capturing sensor, the images corresponding to the video signal from the video interface currently to be detected according to the synchronization signal.

13. The testing method according to claim 9, wherein detecting whether the image corresponding to each video signal is abnormal, includes:

determining whether an abnormality exists between every two adjacent frames of images during the images corresponding to each video signal are displayed; and in response to determine that the abnormality exists between every two adjacent frames of images, sending a detection signal to the controller.

14. The test method according to claim 13, further comprising:

receiving, by the controller, the detection signal sent by the image capturing sensor; and recording, by the controller, a number of times of abnormality during the images corresponding to each video signal are displayed.

15. The test method according to claim 14, further comprising:

controlling, by the controller, the display to display the number of times of abnormality of the images corresponding to each video signal after the controller controls the display to display the images according to each video signal sequentially.

16. A non-transitory computer-readable storage medium having storing computer program instructions thereon, wherein when the computer program instructions run on a processor, the processor performs one or more steps of the testing method according to claim 9.

* * * * *